(12) United States Patent
Penkar et al.

(10) Patent No.: US 7,293,707 B2
(45) Date of Patent: Nov. 13, 2007

(54) INVENTORY MANAGEMENT SYSTEM FOR REDUCING OVERALL WAREHOUSE AND PIPELINE INVENTORY

(75) Inventors: Rajan C. Penkar, Alpharetta, GA (US); Michael D. Johnson, Alpharetta, GA (US); Larry A. Hanlon, Alpharetta, GA (US); Raymond A. Reulbach, Lawrenceville, GA (US); Gina L. Jones, Roswell, GA (US); Tony R. Castagno, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 11/127,655

(22) Filed: May 12, 2005

(65) Prior Publication Data

US 2005/0209731 A1 Sep. 22, 2005

Related U.S. Application Data

(62) Division of application No. 10/387,154, filed on Mar. 11, 2003, now Pat. No. 7,016,764.

(60) Provisional application No. 60/363,604, filed on Mar. 11, 2002.

(51) Int. Cl.
*G06F 19/00* (2006.01)
*G06Q 30/00* (2006.01)
*G06Q 90/00* (2006.01)

(52) U.S. Cl. .................. 235/385; 235/375; 235/487; 705/28

(58) Field of Classification Search ............... 235/385, 235/487, 375; 705/22, 28
See application file for complete search history.

(56) References Cited

U.S. PATENT DOCUMENTS 4,683,540 A  7/1987  Kurosu et al.

(Continued)

FOREIGN PATENT DOCUMENTS

JP          406009022          1/1994

(Continued)

OTHER PUBLICATIONS

Ken Cottrill, e-Strategies, Fringe Benefits, magazine, Aug. 4, 2003, p. 13, trafficWorld, USA.

(Continued)

*Primary Examiner*—Ahshik Kim
*Assistant Examiner*—Edwyn Labaze
(74) *Attorney, Agent, or Firm*—Alston & Bird LLP

(57) ABSTRACT

A computer system for use in reducing overall pipeline inventory within a distribution network that includes a central warehouse that is: (1) adjacent a transportation hub; and (2) configured to store sufficient component parts to provide a regular stream of parts to each of a plurality of manufacturing facilities. The computer system is preferably configured for coordinating the transportation of a regular stream of parts to each of the manufacturing facilities by transporting component parts from the central warehouse to the manufacturing facilities primarily via an expedited delivery service performed using the transportation hub. The expedited delivery service may include, for example, guaranteed delivery within one or two days. This reduces the overall pipeline and warehouse inventory within the distribution network by reducing the average transit time for each part, and by reducing the amount of safety stock that is needed to support the operations of the manufacturing facilities.

16 Claims, 5 Drawing Sheets

U.S. PATENT DOCUMENTS

| | | | |
|---|---|---|---|
| 5,204,821 A * | 4/1993 | Inui et al. ................. 700/106 |
| 5,586,037 A | 12/1996 | Gil et al. |
| 5,631,827 A | 5/1997 | Nicholls et al. |
| 5,884,300 A | 3/1999 | Brockman |
| 5,959,568 A | 9/1999 | Woolley |
| 6,049,742 A | 4/2000 | Milne et al. |
| 6,078,900 A | 6/2000 | Ettl et al. |
| 6,098,892 A * | 8/2000 | Peoples, Jr. ................. 235/494 |
| 6,134,593 A * | 10/2000 | Alexander et al. ......... 709/229 |
| 6,148,291 A | 11/2000 | Radican |
| 6,182,053 B1 | 1/2001 | Rauber et al. |
| 6,285,916 B1 * | 9/2001 | Kadaba et al. .............. 700/222 |
| 6,324,522 B2 | 11/2001 | Peterson et al. |
| 6,338,045 B1 * | 1/2002 | Pappas ........................ 705/29 |
| 6,356,802 B1 * | 3/2002 | Takehara et al. ............ 700/215 |
| 6,366,829 B1 | 4/2002 | Wallace |
| 6,397,131 B1 * | 5/2002 | Busch et al. ................. 701/29 |
| 6,463,345 B1 | 10/2002 | Peachey-Kountz et al. |
| 6,789,729 B1 * | 9/2004 | Solan et al. ................ 235/375 |
| 6,945,459 B2 * | 9/2005 | Flanagan .................... 235/385 |
| 7,062,455 B1 * | 6/2006 | Tobey .......................... 705/28 |
| 7,100,826 B1 * | 9/2006 | Phan et al. .................. 235/385 |
| 2001/0023376 A1 | 9/2001 | Uchida et al. |
| 2001/0027429 A1 | 10/2001 | Uemura |
| 2001/0032222 A1 | 10/2001 | Takahashi et al. |
| 2001/0034674 A1 | 10/2001 | Hoffman |
| 2001/0053949 A1 | 12/2001 | Howes et al. |
| 2002/0019761 A1 | 2/2002 | Lidow |
| 2002/0026384 A1 * | 2/2002 | Imanaka et al. .............. 705/27 |
| 2002/0035525 A1 | 3/2002 | Yokota et al. |
| 2002/0042735 A1 | 4/2002 | Narahara et al. |
| 2002/0052862 A1 | 5/2002 | Scott et al. |
| 2002/0059121 A1 | 5/2002 | Schneider et al. |
| 2002/0082956 A1 | 6/2002 | Peterson et al. |
| 2002/0087438 A1 | 7/2002 | Kunieda et al. |
| 2002/0091536 A1 | 7/2002 | Seaman et al. |
| 2002/0095232 A1 | 7/2002 | Jorgenson et al. |
| 2002/0099579 A1 | 7/2002 | Stowell et al. |
| 2002/0111819 A1 | 8/2002 | Li et al. |
| 2002/0116241 A1 | 8/2002 | Sandhu et al. |
| 2002/0128913 A1 | 9/2002 | Ower |
| 2002/0128944 A1 | 9/2002 | Crabtree et al. |
| 2002/0133387 A1 | 9/2002 | Wilson et al. |
| 2002/0138358 A1 | 9/2002 | Scheer |
| 2002/0143862 A1 * | 10/2002 | Peterson ..................... 709/203 |
| 2002/0147518 A1 * | 10/2002 | Nguyen ....................... 700/108 |
| 2002/0152140 A1 | 10/2002 | Kondo et al. |
| 2002/0156768 A1 | 10/2002 | Ohta |
| 2003/0101168 A1 * | 5/2003 | Chow et al. ................... 707/3 |
| 2003/0115115 A1 * | 6/2003 | Ouchi ......................... 705/27 |
| 2004/0249652 A1 * | 12/2004 | Aldstadt ....................... 705/1 |
| 2006/0011721 A1 * | 1/2006 | Olsen et al. ................ 235/385 |

FOREIGN PATENT DOCUMENTS

WO    WO 90/11572    10/1990

OTHER PUBLICATIONS

International Search Report from corresponding International Application No. PCT/US03/07634, dated Nov. 25, 2003.

* cited by examiner

INVENTORY MANAGEMENT SYSTEM FOR REDUCING OVERALL WAREHOUSE AND PIPELINE INVENTORY

CROSS REFERENCE TO RELATED APPLICATION

This application is a divisional of U.S. application Ser. No. 10/387,154, which was filed Mar. 11, 2003, now U.S. Pat. No. 7,016,764 and which is hereby incorporated by reference in its entirety. This application claims the benefit of U.S. Provisional Application Ser. No. 60/363,604, which was filed on Mar. 11, 2002.

FIELD OF THE INVENTION

This invention relates to systems and methods for coordinating the delivery of items (such as component parts) from a supplier to a manufacturer. This system and method is discussed below in relation to delivering component parts from a supplier of electronics components (or "parts") to an electronics manufacturer. However, as will be understood by one skilled in the art, the concepts described below may be applied to coordinating the delivery of other items, such as mechanical parts or finished consumer items.

BACKGROUND OF THE INVENTION

One important aspect of manufacturing is maintaining a reliable and predictable supply chain of components from suppliers to manufacturers. A typical supply chain requires the involvement and coordination of several different participants. These participants typically include one or more of each of the following: (1) suppliers; (2) third party logistics providers (3PL's); (3) contract manufacturers; and (4) Original Equipment Manufacturers (OEM's). These different participants are discussed briefly below.

OEM's are manufacturers and distributors of products. OEM's have traditionally manufactured at least some of their products in-house, but there is a trend to outsource more manufacturing work to contract manufacturers. Dell and Compaq are examples of OEM's.

Suppliers typically manufacture component parts that are needed to produce a larger product. An example of a well-known component supplier is Intel, a company that produces microprocessors and other components that are used within larger electronic devices, such as personal computers and servers.

Third party logistics providers are third party companies (such as UPS Supply Chain Solutions) that coordinate the shipping of parts from suppliers to manufacturers. These "3PL's" often maintain warehouse facilities (such as proximity hubs) for storing components before the components are needed by manufacturers.

Contract manufacturers are manufacturers who perform manufacturing work on a contractual basis. These contract manufacturers have historically produced sub-assemblies for use in larger products, but now also commonly produce finished products (such as personal computers and servers) for OEM's, which then distribute the products. Solectron, Flextronics, and Celestica are examples of contact manufacturers.

Ideally, a supply chain would be coordinated so that a dependable stream of parts would be shipped from a supplier to a manufacturer (for example, a contract manufacturer or OEM) so that parts would always arrive at the precise moment that the parts are needed at the assembly line. This ideal supply chain would also be structured so that the manufacturer would always have sufficient parts to manufacture products at the manufacturer's desired rate without interruption.

Of course, due to the realities of the manufacturing and logistics worlds, such an idealized situation would be difficult, if not impossible, to achieve. This is due, in part, to fluctuations in supply and demand for both the component parts produced by the supplier and for the finished items produced by the manufacturer. The unpredictability typically associated with shipping parts over long distances has also made it difficult to attain the idealized logistics situation described above.

These real-world uncertainties have resulted in unpredictable supply streams in which it is difficult to determine exactly when parts will arrive at a given manufacturing plant (or at a local storage facility, such as a proximity hub, associated with the manufacturing plant). Accordingly, to avoid any interruption in manufacturing production due to lack of parts, manufacturers typically maintain a stockpile of parts called "safety stock" at a local storage facility (such as a proximity hub) close to the manufacturing plant.

As will be understood by one skilled in the relevant field, the amount of safety stock that a manufacturer needs to have available near a manufacturing facility (e.g., a manufacturing plant) in order to assure uninterrupted operation of their manufacturing facilities is directly related to the predictability of the supply of products to the manufacturing facility (or a warehouse close to the manufacturing facility). For example, if a manufacturer can rely on needed parts to arrive within a two day delivery window, the manufacturer may only need to keep a two to three day safety stock of parts on hand. However, if the manufacturer can only rely on needed parts to arrive within a seven day delivery window, the manufacturer would need to keep a significantly larger safety stock on hand to assure uninterrupted operation of the manufacturing facilities.

In recent years, demand for electronic components has been relatively low. This has provided manufacturers with increased market power in negotiating the terms of supply agreements with component manufacturers. As a result, manufacturers have begun to demand that suppliers enter into Vendor Managed Inventory (VMI) agreements (also known as Supplier Managed Inventory (SMI) agreements) in which the supplier maintains a sufficient safety stock of the supplier's parts in a warehouse (called a proximity hub, or a VMI) within a short distance of each of the manufacturer's manufacturing facilities.

Under the terms of a typical VMI agreement, the supplier must maintain an amount of safety stock within each proximity hub that is sufficient to assure that operations at the neighboring manufacturing facility will not be interrupted due to lack of the supplier's parts. Typically, ownership of these parts is not transferred from the supplier to the manufacturer until the manufacturer requests (or "pulls") the parts from the supplier. This forces the suppliers to bear the cost and risk of maintaining the manufacturer's safety stock (and of maintaining this inventory on their books), and to dedicate an often unnecessarily excessive amount of stock to a single manufacturing facility.

Current VMI arrangements are advantageous to manufacturers because: (1) there is a significant reduction in component inventory because the supplier is forced to maintain this inventory; and (2) the close proximity of the proximity hubs to the factory ensures production continuity and upside protection. Current VMI arrangements provide at least one advantage to suppliers in that they allow for "actual usage" visibility, which improves inventory forecast accuracy for the supplier.

Understandably, because current VMI practices are unfavorable to suppliers, very few suppliers are willing to agree to such arrangements. In addition, it is expected that, as demand for component parts increases, even fewer (if any) suppliers will be willing to agree to these prior art VMI arrangements.

One particular disadvantage of current VMI systems is lack of visibility. It is currently common for a given supplier to supply parts to proximity hubs that are run by many different 3PL companies. These 3PL companies can range in sophistication from large, sophisticated 3PL providers to small, local, unsophisticated 3PL providers. As a result, suppliers have difficulty obtaining information on the status and allocation of their parts while the parts are stored at the proximity hubs, and manufacturers have difficulty obtaining information regarding their current allocation of parts and the shipping status of these parts. As will be understood by one skilled in the relevant filed, this, along with unpredictable variations in demand, has contributed to the undesirable "bullwhip effect", which causes manufacturers to request that excessive numbers of parts be maintained at their proximity hubs. This lack of visibility has also made it difficult for suppliers to quickly and effectively re-allocate parts from one manufacturer to another in response to changing market conditions.

The following is a list of selected disadvantages associated with current VMI arrangements:

1. They result in an excessive amount of inventory being stored at the various proximity hubs. This inventory is essentially only available for purchase by those manufacturers nearby. Thus, manufacturers monopolize the inventory, but have no commitment to buy it. Furthermore, manufacturers often over-order to make absolutely sure that they will always have the components that they need. Thus, this situation is not advantageous for the supplier.
2. Revenue realization is delayed for the supplier because ownership of the supplier's goods is not transferred until the goods are "pulled" for use by the manufacturer.
3. The supplier's inventory is fragmented into multiple proximity hubs that are typically run by multiple (small) 3PL organizations. This increases the risk that certain parts may go unused.
4. There is typically no unified inventory visibility once parts are consigned to proximity hubs.
5. It is difficult, using prior art VMI systems, to reallocate consigned inventory based on changes in demand.
6. The demand fragmentation at a large number of proximity hubs reduces forecast accuracy.
7. It is difficult and expensive to aggregate parts using current VMI systems.
8. The overall visibility available according to current, prior art VMI arrangements is typically very low. As a result, even if a supplier had extra parts at one proximity hub, and needed parts at another proximity hub, the supplier would have no way of knowing this.
9. The lack of visibility within current VMI systems leads to a lack of trust by the manufacturers that their parts will arrive on time. This is a further incentive for manufacturers to order more parts from the supplier than they really need, which results in unnecessarily high inventory costs.
10. Because large stockpiles of safety stock are maintained at the VMI, suppliers are exposed to the risk that the stored products will become obsolete while in storage. This is a significant risk in industries, such as the electronics industry, in which parts tend to become outdated quickly.

SUMMARY OF THE INVENTION

The present invention provides an improved logistics system. In one embodiment of the invention, the system is configured for tracking items, such as component parts, within a central warehouse. In this embodiment of the invention, the system is configured for: (1) assigning a first identification indicia to an item within the central warehouse; (2) updating a database to associate the first identification indicia (such as a first part number) with the item; (3) receiving a request to reallocate the item from a first entity to a second entity; (4) in response to receiving the request, reallocating the item from the first entity to the second entity; (5) in response to the item being reallocated from the first entity to the second entity, assigning a second identification indicia (such as a second part number) to the item; and (6) updating the database to associate the second identification indicia with the item.

A system according to another embodiment of the invention is configured for tracking parts at a central warehouse. More particularly, this system is configured for: (1) assigning a first part number to a part within the central warehouse; (2) updating a database to associate the first part number with the part; (3) receiving an indication that the part has been modified; (4) in response to receiving the indication, assigning a second part number to the part; and (5) updating a database to associate the second part number with the part. In one embodiment of the invention, the step of receiving an indication that the part has been modified comprises receiving an indication that the part has been loaded with a particular type of software. In this embodiment, the second part number preferably corresponds to a part that has been loaded with the particular type of software loaded onto the part.

The system is preferably configured for maintaining a history of one or more part numbers that were formally associated with the part. In one embodiment of the invention, the system is configured for maintaining a history of substantially all of the part numbers that have been associated with the part since the part initially entered the central warehouse.

A method of distributing parts according to an embodiment of the invention comprises: (1) providing a central warehouse adjacent a transportation hub, such as an air or ground hub; (2) maintaining sufficient parts within the central warehouse to provide a regular stream of parts to each of a plurality of manufacturing facilities; and (3) providing a regular stream of parts to each of the manufacturing facilities by transporting component parts from the central warehouse to each of the manufacturing facilities primarily via an expedited delivery service performed using the transportation hub. The expedited delivery service may include, for example, guaranteed delivery within one or two days.

In one embodiment of the invention, the above-referenced step of providing a regular stream of parts to each of the manufacturing facilities is sufficient to supply, via an expedited delivery service, at least one of the manufacturing facilities with at least about sixty percent, or at least about eighty percent, of the manufacturing facility's needed supply of a particular kind of component part. In a particular embodiment of the invention, the central warehouse is used to supply a regular stream of parts to each manufacturing facility within a nationwide network of manufacturing facilities.

A method according to a further embodiment of the invention includes the additional steps of: (1) transporting a particular part from the central warehouse to a particular one of the manufacturing facilities; and (2) after the particular part has been assembled into a finished product at the particular manufacturing facility, transporting the finished product back to the central warehouse via the transportation hub. This method also may include the step of performing a value added service on the finished product at the central warehouse. This value added service may include, for example, labeling the product or assembling the finished product into a kit. In one embodiment of the invention, after the finished product is transported to the central warehouse via the transportation hub, the finished product is sent to a customer via the transportation hub.

In one embodiment of the invention, the component parts include one or more electronic components (such as computer chips), and the inventive method comprises the step of loading software onto the electronic components at the central warehouse. One embodiment of the invention includes the step of assigning at least a particular one of the electronic components a part number in response to the step of loading software onto the particular one of the electronic components. This part number preferably indicates the functionality of the programmed computer chip.

A method according to yet another embodiment of the invention includes the steps of: (1) storing a plurality of parts in a central warehouse; and (2) allowing a user to reallocate (preferably simultaneously) the plurality of parts from a first entity to a second entity without requiring the plurality of parts to be physically moved from the central warehouse. This method preferably further comprises the step of allowing a user to reallocate the plurality of parts from a second entity to a third entity without requiring the plurality of parts to be physically moved from the central warehouse.

A method according to another embodiment of the invention includes the additional steps of: (1) storing the plurality of parts in the central warehouse for a first period of time during which the plurality of parts are allocated to a first entity; (2) after the step of storing the plurality of parts in the central warehouse for the first period of time, receiving a request to reallocate the plurality of parts from the first entity to the second entity; (3) in response to receiving the request, reallocating the plurality of parts from the first entity to the second entity; and (4) after reallocating the plurality of parts to the second entity, continuing to store the plurality of parts in the warehouse. In one embodiment of the invention, the method includes the additional steps of: (1) after reallocating the plurality of parts to the second entity, receiving a second request to reallocate the plurality of parts from the second entity to a third entity; (2) in response to receiving the second request, reallocating the plurality of parts from the second entity to the third entity; and after reallocating the plurality of parts to the third entity, continuing to store the plurality of parts in the warehouse.

In a preferred embodiment of the invention, the method further comprises the step of providing a computer system that is configured to allow a user to use a "drag-and-drop" technique on a display screen to perform the step of reallocating (preferably simultaneously) the plurality of parts from the first entity to the second entity. The system is preferably configured to reallocate the plurality of parts from a first entity to a second entity without changing a physical position of the plurality of parts within the central warehouse.

BRIEF DESCRIPTION OF THE DRAWINGS

Figure 1:
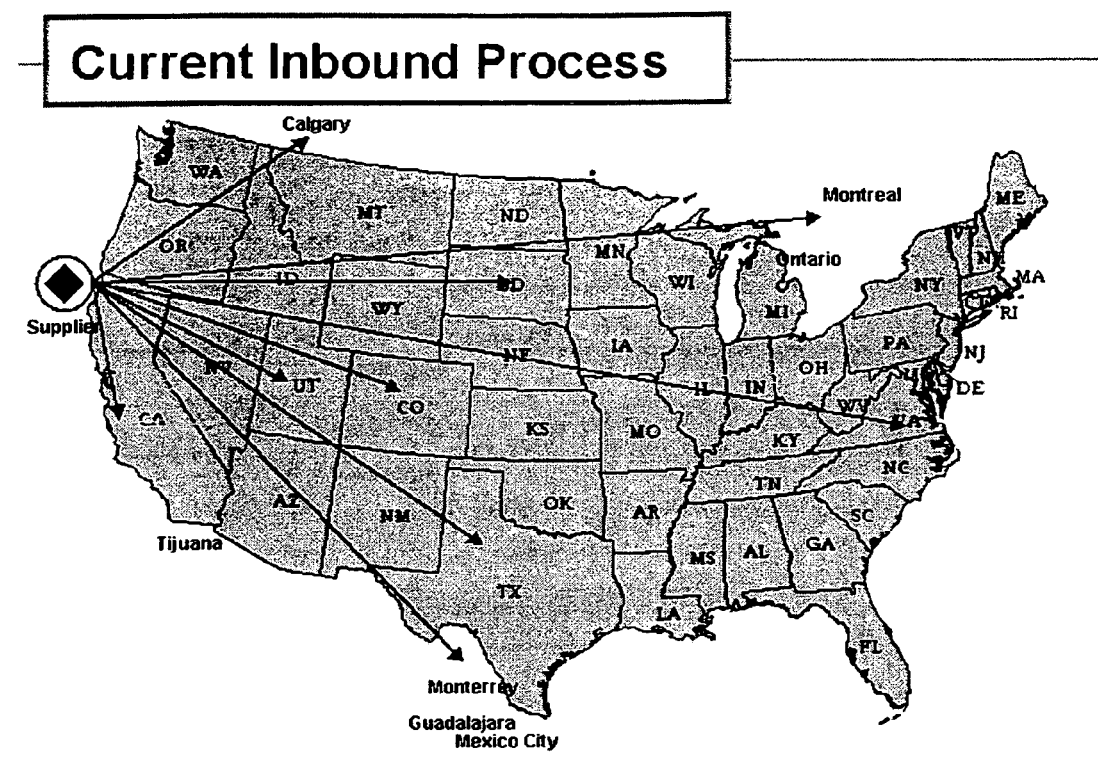

Having thus described the invention in general terms, reference will now be made to the accompanying drawings, which are not necessarily drawn to scale, and wherein:

FIG. 1 is a graphical depiction of a typical inbound distribution flow of electronic parts under a prior art VMI system.

Figure 2:
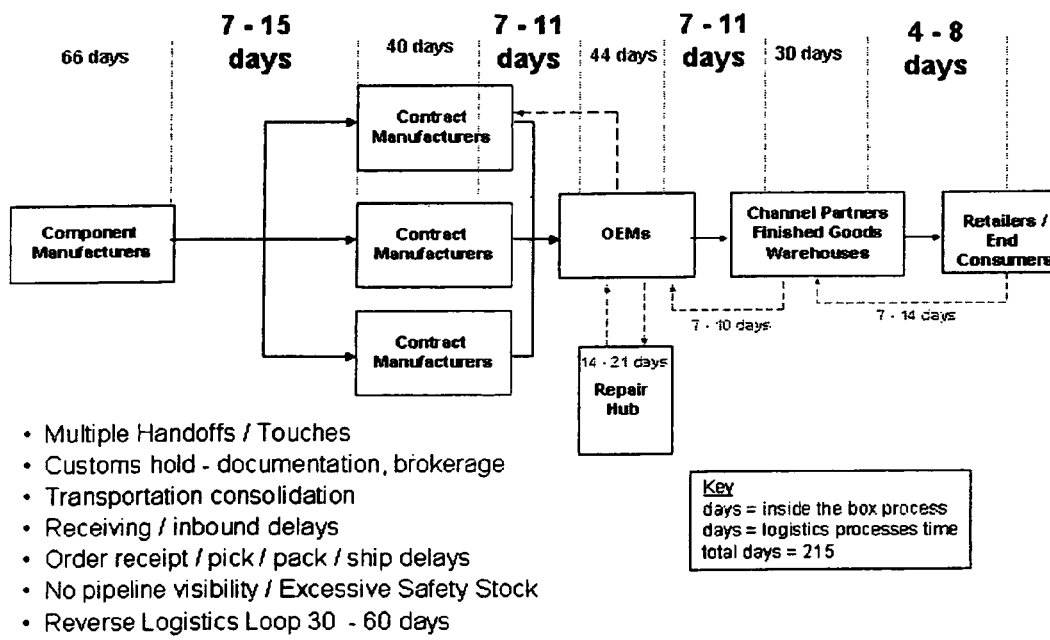

FIG. 2 is a schematic depiction of a prior art electronics manufacturing supply chain.

Figure 3:
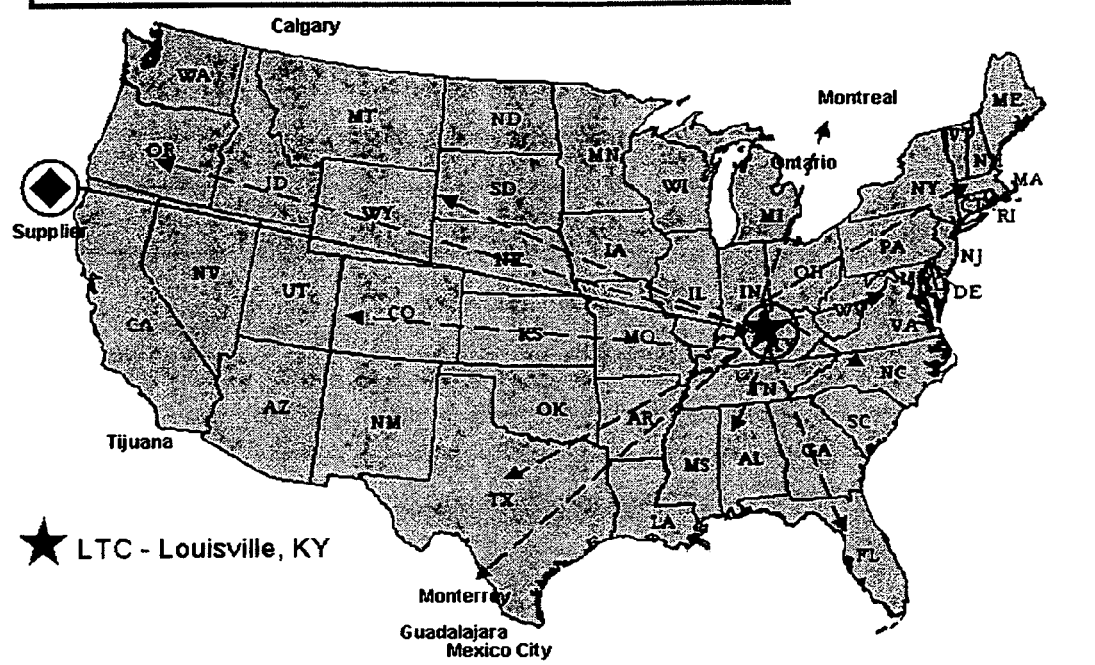

FIG. 3 is a graphical depiction of the distribution flow of a "Direct Replenishment Model" logistics system according to one embodiment of the invention.

Figure 4:
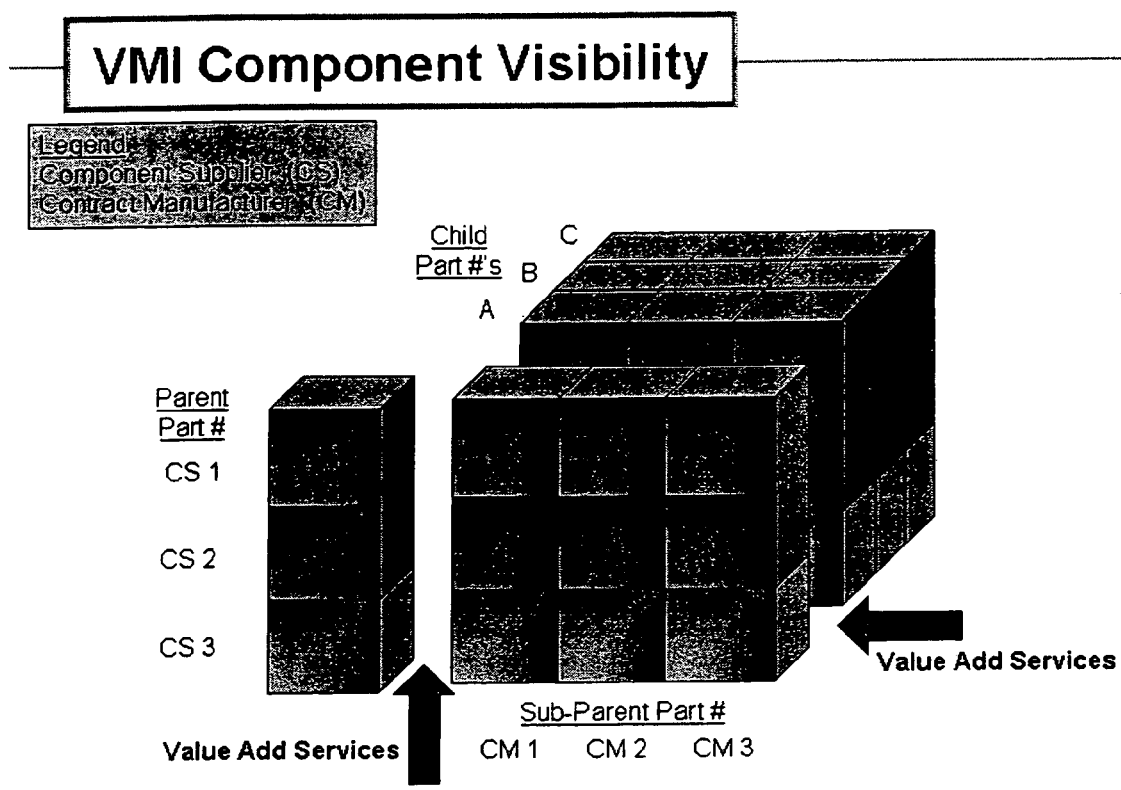

FIG. 4 graphically depicts how value added services preferably occur at the LTC, and how these value added services affect a part's part number according to one embodiment of the invention.

Figure 5:
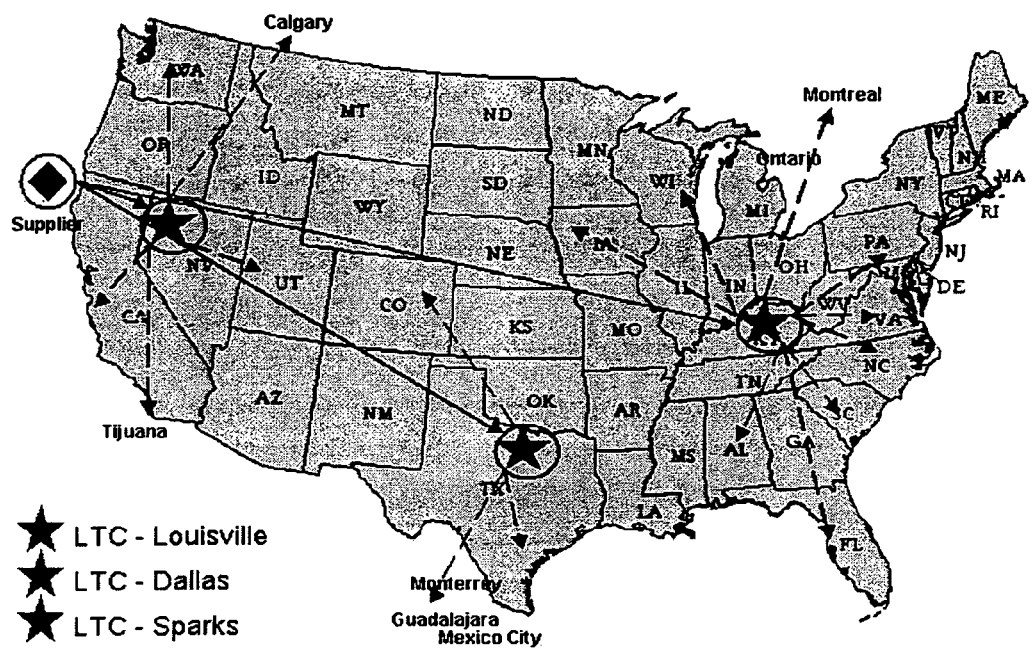

FIG. 5 is a graphical depiction of the distribution flow of a "Regional Replenishment Model" logistics system according to one embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. For example, the present invention may be embodied in a computer system that is configured to coordinate, preferably in an automated manner, the methods described below.

Furthermore, the present invention may take the form of a computer program product on a computer-readable storage medium having computer-readable program code embodied in the storage medium. More particularly, the present invention may take the form of web-implemented computer software. Any suitable computer-readable storage medium may be utilized including hard disks, CD-ROMs, optical storage devices, or magnetic storage devices.

Turning to the enclosed figures, FIG. 1 shows a typical inbound distribution of electronic parts under a prior art VMI system. In prior art electronics VMI supply chains, electronic components are typically shipped directly from suppliers in Asia to a location on the West Coast, such as San Francisco. The parts are then routed, for example, via standard delivery from this location to the various proximity hubs. As shown in FIG. 2, under this system, it takes from 7 to 15 days to execute the logistics processes needed to transport parts from the suppliers (i.e., the component manufacturers) to the contract manufacturers. As discussed above, the variability in time that it takes to deliver components from the suppliers to the manufacturers makes it necessary for manufacturers to maintain additional safety stock of components near their manufacturing facilities (usually at a proximity hub near their plants).

In a preferred embodiment of the current invention, components are shipped directly from the supplier to one or more central warehouses called a Logistics and Technology Centers (LTC's). Each LTC is used to supply parts to multiple proximity hubs (i.e., "VMI's"). In a preferred embodiment of the invention, each LTC is located a short distance from a transportation hub, such as an air or ground hub. For example, in a preferred embodiment of the invention, each LTC is located within 30 miles, and preferably within 5 miles of a transportation hub. In a preferred embodiment of the invention, each LTC is located a short distance from a transportation hub from which it is possible to make expedited shipments to a wide geographical range of locations and preferably to a nationwide network of manufacturing facilities. In a preferred embodiment of the invention, at least one LTC is located within 30 miles, and preferably within 5 miles of an air transportation hub.

The VMI logistics system of the present invention can preferably be customized to suit the needs of the particular situation at hand. However, there are currently two preferred embodiments of the system. In the first preferred embodiment, called the direct replenishment model (an example of which is depicted in FIG. 3), an LTC is provided directly next to an air hub. (Such an LTC is often referred to an "end of runway facility".) Parts are shipped directly from suppliers to the LTC, and the parts are shipped from the LTC to the individual proximity hubs (or directly to individual manufacturing plants) as the parts are requested by particular manufacturers.

Because the LTC is located directly next to an air-hub shipping facility, it is possible to reliably ship components from the LTC to a large number of proximity hubs within 24 hours. In a preferred embodiment of the invention, a single LTC is provided in Louisville, Ky. directly next to an air hub transportation facility. This LTC may preferably be used to supply parts to proximity hubs throughout North America. The logistics network is preferably configured so that parts can be reliably delivered from the LTC to any proximity hub supplied by the LTC within 48 hours of the part being requested. The logistics network is also preferably configured so that the parts may be delivered from the LTC to any of the various proximity hubs supplied by the LTC via next day or same day delivery, as necessary.

Stated generally, one method associated with the direct replenishment model includes the steps of: (1) providing a central warehouse adjacent a transportation hub; (2) maintaining sufficient parts within the central warehouse to provide a regular stream of parts to each of a plurality of manufacturing facilities; and (3) providing a regular stream of parts to each of the manufacturing facilities by transporting component parts via an expedited delivery service that is performed using the transportation hub. The parts are transported either directly from the central warehouse to various manufacturing facilities, or to regional warehouses (e.g., proximity hubs) associated with the manufacturing facilities. In one embodiment of the invention, the regular stream of parts provided by the central warehouse is sufficient to supply at least one of the manufacturing facilities with at least about sixty percent (or at least about 80 percent) of the manufacturing facility's needed supply of a particular kind of component part.

The advantage of the "direct replenishment model" described above is that it makes it possible, when supply and demand variability are considered, to store most of the safety stock required for multiple proximity hubs at a central storage facility (e.g., an LTC). This dramatically reduces the need to store parts at remote proximity hubs close to individual manufacturing plants.

One key aspect of the current system is the fact it uses expedited delivery (such as guaranteed one-day or two-day delivery) from the central warehouse (e.g., LTC) to the various proximity hubs to produce a very predictable and reliable stream of deliveries to the proximity hubs. Because this delivery stream is so predictable, it is only necessary to store a relatively small number of parts at the individual proximity hubs. For example, in one preferred embodiment of the system, using the logistics system described above, it would only be necessary to store less than a day's worth of safety stock at each proximity hub. This is a dramatic improvement from the 6-7 days worth of safety stock that must be stored at each proximity hub using prior art VMI systems, and an even more dramatic improvement from the 30 days worth of safety stock that many manufacturers require in light of the uncertainties associated with prior art VMI systems.

There are many advantages associated with the logistics system described above. First, centralizing safety stock for multiple plants in a central location reduces the total safety stock that must be kept on hand to assure that each plant within the network has sufficient parts to maintain normal operations. This is due to a known logistics principle called Maister's theory. According to Maister's theory, provided that each plant that is supported by a single warehouse is using common parts, the amount of additional safety stock (of the common parts) that must be stored at the warehouse to support an additional plant is significantly less than the amount of safety stock that would be required to support the plant if the safety stock were stored near the plant and dedicated only to that plant.

In addition, according to Maister's theory, the amount of additional safety stock that must be stored at the warehouse to support each plant decreases as the number of plants supported by the warehouse increases. Thus, the safety stock per plant ratio decreases as additional plants are added to be supported by the central warehouse.

Another advantage of centralizing the stock of multiple plants in an LTC is that it makes tracking inventory much easier than if the parts were stored in multiple, remote proximity hubs. This is due to the fact that a single 3PL and a single inventory management system can be used to track all of the inventory within the LTC. As discussed in more detail below, this can lead to enhanced management capabilities and visibility for both suppliers and manufacturers.

A further advantage of centralizing the stock of multiple plants (regardless of whether the plants are owned by a single or multiple manufacturers) in an LTC is that it makes reallocating parts from one plant to another (and/or from one manufacturer to another) substantially easier than if the parts were stored in multiple proximity hubs. In prior art VMI systems, in order to reallocate a part from one plant to another, it is necessary to identify a suitable part at another plant's proximity hub (which is difficult due to the limited visibility associated with prior art systems). If such a part is located, the part must then be physically shipped from its current proximity hub to the proximity hub associated with the plant to which the part was being reallocated. This process is time consuming, and expensive.

Because, in a system according to the present invention, the majority of safety stock is stored at a single LTC, reallocating parts from one plant to another is simply a matter of updating a database to indicate the change in allocation. Because all of the parts allocated for all of the various plants in the network are maintained at the same location, there is no need to ship a part from one proximity hub to another to execute a reallocation of the part. However, in some circumstances, it may be desirable to relocate particular parts within the LTC after the parts have been reallocated in order to facilitate later shipping of the reallocated parts.

In a preferred embodiment of the invention, the system includes a relational database that stores information regarding the current allocation of each part that is located at the LTC. To reallocate a part from one plant to another, a user simply updates this database to reflect the new reallocation. The user may be, for example, a 3PL employee who is processing a reallocation request received from a manufacturer.

It should be understood that parts may be freely allocated between different plants owned by a single contract manufacturer or OEM. (For example, if Dell's production facility in Florida experiences spike in demand for a particular part, and Dell's production facility in Oregon experiences decrease in demand for that part, parts from Dell's Oregon facility may be reallocated to Dell's Florida facility to accommodate the spike in demand.)

Furthermore, parts may also be freely allocated between different plants owned by different contract manufacturers or OEM's. (For example, if Dell's production facility in Florida experiences a spike in demand for a particular part and Compaq's production facility in Texas experiences a decrease in demand for the part, the supplier can simply reallocate parts from Compaq's Texas facility to Dell's Florida facility.) A supplier's ability to perform such re-allocations will, of course, depend upon the terms of the supplier's current agreements with the individual contract manufacturers and OEM's. In one embodiment of the invention, in order to assure that reallocations are made only by properly authorized individuals, all reallocations will be made by 3PL employees, such as 3PL business analysts.

Thus, using an LTC is advantageous because it provides a large stockpile of inventory in a single location and any particular component within that stockpile may be re-allocated from one manufacturing plant to another (and/or from one manufacturer to another) without physically moving the part. This presents a huge advantage in the common situation in which a supplier is supplying the same component to many different manufacturing facilities. As demands change, the supplier can quickly change allocations to satisfy demand without shifting the physical location of components. This aspect of the LTC is also advantageous because it reduces overall pipeline inventory throughout the supply chain.

Value-Added Services

Another aspect of the present invention is that the LTC's may be configured for performing value-added services on parts while the parts are being stored at the LTC. This eliminates the need to ship the parts to an outside facility to have these services completed. Such value-added services may, for example, include labeling services, programming services, and kitting services. Typical labeling services include stamping parts with an appropriate part name and/or part number. Typical programming services include loading software onto component parts, such as computer chips. Typical kitting services include assembling several individual parts into a kit.

Providing such value added services at an LTC further increases opportunities to aggregate parts at the LTC. This is due to the existence of "parent parts", which are parts that may be used in several different products, either with or without modification. For example, a single type of computer chip may be used in a particular model of Dell computer, a particular model of Compaq computer, and a particular video game system offered by Microsoft. In such a situation, a stockpile of the parent part can be maintained at the LTC and appropriately labeled at the LTC when it is determined that the product will shipped to a certain manufacturer.

Similarly, a single parent part (such as a computer chip) may be programmed to perform different functions within a single product, or within several different products. For example, a single computer chip may be programmed to perform a first function in a Compaq computer or a second function in the same Compaq computer. Similarly, the same computer chip may be programmed to perform a entirely different third function in a Dell computer. In such a situation, a stockpile of the parent part can be maintained at the LTC and appropriately programmed and labeled at the LTC when the ultimate function and manufacturer is identified for the computer chip.

According to Maister's theory, the fact that a single parent part may be used to satisfy an order for several different individual parts reduces the amount of safety stock that must be maintained to assure a proper supply of the different individual parts. Thus, for example, under certain circumstances, it may be necessary to maintain a safety stock of 1000 items of part A, and 1000 items of part B if a common parent part may not be used to fulfill orders of both parts A and B. However, under these same circumstances, it may only be necessary to maintain a safety stock of 1700 parent parts if the parent parts may be used to fulfill orders for both parts A and B.

Accordingly, equipping an LTC with the ability to customize parent parts to satisfy the orders for many different parts further increases aggregation opportunities at the LTC. This, in turn, further reduces the amount of total inventory needed for safety stock and reduces the overall logistics costs associated with the system.

FIG. 4 generally depicts the flow of how value added services would preferably occur at the LTC. First, parent parts would arrive at the LTC. (Such parts are depicted in the left-hand block shown in this figure.) When these parts arrive at the plant they are associated with a parent part number that is provided by the component supplier (CS) that manufactures the part.

Once the system determines which manufacturing facility will receive the part, the part is labeled with the appropriate brand name and manufacturing facility label. This labeling process can be initiated manually, automatically by the system, or in any other manner known in the art. (After this labeling process, the part is associated with a new part number that reflects the fact that the part has been labeled for use by the particular contract manufacturer. Parts that have undergone a first value-added service, such as labeling are indicated by the middle block within FIG. 4.)

Next, after the system determines how the parent part is to be configured for operation, the part is configured at the LTC in the appropriate manner. For example, at this stage, a computer chip may be loaded with the appropriate software. The part may also be labeled at this stage to indicate the functionality of the part (which may correspond to the functionality of the software loaded onto the part) with a unique part number.

Like the labeling process, the configuration process can be initiated manually, automatically by the system, or in any other manner known in the art. (After this configuration process, the part is associated with a new "Child Part Number" that reflects the fact that the part has been configured for a particular use. Parts that have undergone a second value-added service, such as configuration, are indicated by the right-most block within FIG. 4.) The part is then distributed to the manufacturer.

It is important to note that similar techniques may be used to perform only a single value-added service on a part before the part is shipped to a manufacturer, or no value added services before a part is shipped to a manufacturer. Similarly, while the example described above is described as including label and part configuration as value-added services, any of a wide variety of different value-added services may be performed in the place of either or both of these value added services.

In a preferred embodiment of the invention, any value-added services are performed on the parent parts shortly before they are shipped to the manufacturer for use. This preserves the generic nature of the parent parts as long as possible, which maximizes the amount of time that it possible to easily reallocate the parts to other plants and/or manufacturers.

Regional Replenishment Model

It should be understood that the "direct replenishment" model described above includes somewhat increased transportation costs. These transportation costs are incurred because expedited shipping is used to transport components from the LTC to the individual proximity hubs. However, the slightly increased transportation costs associated with the system of the present invention are offset by the increased savings in inventory-related costs, provided the cost of each component part is above a certain level. Thus, the "direct replenishment" model is generally cost-effective for high-cost parts (e.g., parts that cost over $4 each). In one example, in which each part costs $25, the reduction in logistics-related costs associated with a "regional replacement" logistics model is over 30%.

For mid-priced parts (e.g., parts that cost around $3.50), the reduced inventory costs provided by the system described above may be offset by the higher transportation costs associated with expedited shipping. Thus, the model described above may not be cost-effective for some mid-priced parts. However, as discussed in greater detail below, the direct replenishment model may be modified to use the principles described above in a cost-effective manner for transporting mid-priced parts by using a modified version of the direct replenishment model called the "regional replenishment model". A graphic depiction of an example of such a model is shown in FIG. 5.

As may be understood from FIG. 5, the "regional replenishment model" operates in much the same way as the "direct replenishment" model described above, except that additional LTC's are added, and each LTC covers a reduced delivery area. In this model, each LTC is still preferably located close to a shipping hub. In one embodiment of the invention, one or more of the shipping hubs is a ground hub rather than an air hub. Because each LTC only supplies proximity hubs within a limited geographic area, expedited air delivery between the LTC and the proximity hubs is not normally necessary. However, because the LTC is preferably located at the shipping hub, and because the distance between the LTC and each proximity hub is preferably relatively short, it is still possible to provide fast, reliable deliveries between the LTC and the proximity hubs, even without expedited air delivery.

However, because the transportation time between the LTC's and the proximity hubs is not as fast as the direct replenishment model, it is necessary to maintain a larger safety stock at the individual proximity hubs. This fact, combined with the fact that the costs of the parts involved in this model are less than that in the "direct replenishment" model discussed above, results in inventory-related savings that are less than the savings associated with the "direct replenishment" model. Thus, although the shipping costs associated with this model are reduced somewhat, the inventory-related savings achieved by implementing this model are also reduced. As a result, the total savings associated with implementing this "regional replacement" model are generally less than the total savings associated with implementing the "direct replenishment model. In one example, the reduction in logistics-related costs associated with a "regional replacement" logistics model is about 16%.

It is important to note that for some very inexpensive products, even the "regional replacement" model may not be cost effective. For example, for products that cost less than one cent, the inventory-related saving associated with using one or more LTC's may not offset the additional logistics costs associated with implementing the LTC's.

Transporting Finished Parts from Manufacturer

It is important to note that, while the system is described above in relation to transporting component parts from a supplier to a manufacturer, once the system is in place, it may also be used to efficiently transport and distribute finished products from the manufacturer.

For example, after vehicles arrive near the proximity hubs with a load of parts from the LTC and unload these parts, the vehicles can be re-loaded with finished products from the manufacturer. The vehicles may then transport the finished products to the LTC for storage and/or distribution. This is especially efficient, because, as noted above, the LTC's are preferably located directly adjacent a transportation hub, which may be used to both: (1) transport parts or other items from the LTC to a manufacturing facility, and (2) transport parts, sub-assemblies, finished products or other items from the manufacturing facility back to the LTC. In another embodiment of the invention, the transportation hub may also be used to ship finished products to customers. Thus, the transportation hub may be used to expedite shipment of a finished product from the manufacturing facility to an end customer.

The LTC's may also be equipped to perform value-added services on the finished products, such as labeling or kitting the products before shipping. This allows manufacturers to minimize the time it takes to deliver its completed products to market.

Summary of the Selected Advantages Associated with the Use of LTC's

Below is a summary of the advantages of using a centralized LTC to supply multiple proximity hubs under the models describe above:

1. The inventive system and method preferably utilizes time-definite transportation. This results in minimal variability in the supply of parts to the proximity hubs.
2. The inventive techniques result in a large reduction in total inventory, and thus inventory-related costs.
3. The inventory required for the individual proximity hubs is greatly reduced due to predictable, short lead times.
4. A single LTC can be used to service VMI's within a very large geographical region. For example, a single LTC in Louisville can be used to provide service to all of the VMI's within a network of VMI's spread throughout North America.

5. Locating an LTC directly next to an air-hub facility minimizes the time need to deliver parts from the LTC to a proper delivery vehicle. In one embodiment of the invention, the system is configured to allow users to place orders up to midnight on a first day and receive their order by noon the next morning.

6. The LTC's provide opportunities for value added services, such as pre-assembly kitting and configuration.

7. The associated demand aggregation reduces forecast variations.

8. For component manufacturers: These models satisfy the customer's demand for time-definite delivery without increasing pipeline inventory and while reducing cost. They also significantly reduce component inventory.

9. For manufacturers: These models reduce the risk of manufacturing-line shutdowns while lowing costs and providing real time demand of component usage.

Visibility-Related Aspects of the Invention

One disadvantage of prior-art VMI systems is that it is difficult for the various participants in the supply chain to view the status of component parts as the component parts pass through the supply chain. In a preferred embodiment of the invention, the system includes a centralized computer system with visibility features that allow all participants in the supply chain to view the current status and allocation of component parts as the component parts travel through the supply chain.

In a preferred embodiment of the invention, the system is configured to only allow individual users to view information regarding component parts that are pertinent to them. For example, a particular supplier would preferably only be able to view information regarding that supplier's products. Similarly, a particular manufacturer (contract manufacturer or OEM) would preferably only be able to view information regarding products that were owned by or allocated to that manufacturer.

Because different suppliers may be distributing parts through the LTC, it is important that the system include security features that assure that suppliers do not have access to information regarding any competing suppliers' parts that may be handled at the LTC. Similarly, because different manufacturers may be receiving parts from the LTC, it is important that the system include security features that assure that manufacturers do not have access to information regarding any of their competing manufacturer's orders that may be handled through the LTC.

In a preferred embodiment of the invention, the visibility aspects of the system are implemented via the Internet. However, as may be understood by one skilled in the art, these aspects could be implemented using a wide variety of other networks and networking techniques.

To use a system according to a preferred embodiment of the invention, users (which include suppliers, contract manufacturers, OEM's, logistics providers, and any other users that are granted access) may log onto an Internet site on the World Wide Web. This Internet site is preferably maintained by the logistics provider that is operating the LTC.

When a user properly logs on to the Internet site, the system determines what information the user is allowed to access in the system. The system preferably does this by accessing a database that includes information regarding the user's current set of access-related permissions.

In a preferred embodiment of the invention, the system is configured to allow suppliers to view the current location, status, and allocation of all of their component parts as the parts are transported from the supplier to the manufacturer. In a preferred embodiment of the invention, this information includes information regarding the location, status, and allocation of the part during each of the following legs of transportation: (1) from the supplier to the LTC; (2) within the LTC; (3) from the LTC to the appropriate proximity hub; (4) within the proximity hub; (5) from the proximity hub to the manufacturing plant; and (6) within the manufacturing plant.

In a further embodiment of the invention, the system is also configured to display information regarding finished products or subassemblies leaving the manufacturing plant. In a preferred embodiment of the invention, this information includes information regarding the location, status, and (if applicable) allocation of these finished products and subassemblies during each of the following segments of transportation: (1) within the manufacturing plant; (2) from the manufacturing plant to the LTC; and (3) from the LTC to the end consumer.

The current location information displayed by the system for a particular part typically indicates the current physical location of the part. Such information might indicate, for example, that a particular part is on UPS Flight 101. The current status information displayed by the system preferably includes any relevant status information, such as whether the part is being held in customs, whether the part is being uploaded with software, and whether the part is in the process of being labeled. The current allocation information displayed by the system indicates whether the part has been allocated to a particular manufacturer (and/or manufacturing plant) and, if so, which manufacturer (and/or manufacturing plant) the part has been allocated to.

In a preferred embodiment of the invention, the system is configured to allow suppliers to modify the allocation of their parts on-line. For example, a supplier may log onto the system and notice that a current allocation of 1000 units of Part X to Manufacturer A is too much, and that a current allocation of 500 units of Part X to Manufacturer B is too little. The system preferably allows the supplier (or a logistics representative working at the request of the supplier) to easily modify the allocations, as desired. For example, the supplier could modify the current allocations so that 750 units of Part X are allocated to Manufacturer A, and so that 750 units of Part X are allocated to Manufacturer B.

In a preferred embodiment of the invention, the system is configured so that manufacturers can view the current location and status of all of the parts that are allocated to them, regardless of the supplier of the parts. However, the manufacturer can not view any information regarding parts that are allocated to other manufacturers. Thus, the manufacturer is preferably not presented with information that is sufficient to allow the manufacturer to determine how much of the supplier's parts have been allocated to other manufacturers.

In a preferred embodiment of the invention, various logistics providers may also access the system to determine the location, status, and/or allocation of the parts as the parts pass though the supply chain. The extent of this access can be tailored according to the logistics provider's need to access the information.

In a preferred embodiment of the invention, the current status of each part is updated as needed to provide accurate information regarding the part. However, the system may alternatively be configured to update information regarding the part according to a regular schedule. For example, the system may be configured to update the current status of the part once every hour.

As noted above, some parts (called parent parts) are capable of being used to fulfill orders for many different parts. In some instances, these parts are used "as-is" within several different products and are simply provided with different part numbers according to the product that they are used in. For example, a particular memory chip may be referred to as "Part 1121" if used in a Dell computer, but as "Part 928" if used in a Compaq computer.

In other cases, a single parent part can be modified (for example, programmed) to have different functions. Such a parent part may also have different part numbers that are determined by how the parent part is finally configured before delivery to the manufacturer. For example, a computer chip may be referred to as "Part 575" when loaded with a first type of software, but as "Part 723" when loaded with a second type of software.

In a preferred embodiment of the present invention, the system is configured so that it automatically tracks the current part number of any given part, and stores a history of the various part numbers assigned to the part. This is preferably done using known database techniques.

For example, a blank chip may arrive at an LTC as part number A100. The chip may then be allocated to Compaq's San Antonio, Tex. manufacturing facility. As a result, the part number may change to the corresponding Compaq number for the part—C600. (However, the system will still recognize the part as part number A100, or any other part numbers that correspond to the part.) Later, Compaq may decide that it will no longer use part C600 in its products, but Dell may decide to start using a version of this part that is loaded with a particular software.

In response to the above changes in demand, the supplier may first reallocate the part from Compaq to Dell. When this happens, the part number is changed from C600 (Compaq's number for the part) to, for example, D99 (Dell's number for the unprogrammed version of the part). Once the part number has been programmed at the LTC, the part number may change again, for example to D99-B (Dell's part number for the programmed version of the part).

Generally stated, a system according to one embodiment of the invention is configured for performing the steps of: (1) assigning a first identification indicia (e.g., a first part number) to an item within the central warehouse; (2) updating a database to associate the first identification indicia with the item; (3) receiving a request to reallocate the item from a first entity (e.g., a first manufacturer) to a second entity (e.g., a second manufacturer); (4) in response to receiving the request, reallocating the item from the first entity to the second entity; (5) in response to the item being reallocated from the first entity to the second entity, assigning a second identification indicia (e.g., a second part number) to the item; and (6) updating the database to associate the second identification indicia with the item.

The system preferably keeps track of the history of part number changes so that the supplier or other system users can later view this information. In one embodiment of the invention, the history includes one or more part numbers that were formally associated with a particular part. Preferably, the history includes all of the part numbers that were formally associated with the part since it entered the central warehouse.

In a preferred embodiment of the system, the system maintains, in a database, a part number key that includes all of the various part numbers that may correspond to a certain part. For example, the key may indicate that Supplier A's part number A100 corresponds to each of: (1) Dell's part number D999; (2) Compaq's part number C100; and (3) Hewlett Packard's part number HP200. This allows the system to better track parts as the configuration and allocation of the parts changes over time.

CONCLUSION

While the invention above is described in relation to component parts used in the electronics industry, it should be understood that the above system and concepts can be implemented in a wide variety of logistics contexts involving different industries other than the electronics industry, and in contexts involving items other than parts. For example, in one embodiment of the invention, the above techniques may be used to transport items such as finished consumer products rather than component parts. In addition, it should be understood that the various concepts described above may be used in combination with one another, or in combination with other systems. For example, the visibility component described above may be used in combination with existing VMI systems.

Furthermore, while this invention has been disclosed in specific detail with reference to the disclosed embodiments, it will be understood that many variations and modifications may be made within the spirit and scope of the invention described above.

We claim:

1. A system for tracking items within a central warehouse, said system being configured to perform the steps of:
   assigning a first unique identification indicia to an item within said central warehouse;
   updating a database to associate said first unique identification indicia with said item;
   receiving a request to reallocate said item from a first corporate entity to a second corporate entity;
   in response to receiving said request, reallocating said item from said first corporate entity to said second corporate entity without physically moving said item;
   in response to said item being reallocated from said first corporate entity to said second corporate entity, assigning a second unique identification indicia to said item; and
   updating said database to associate said second unique identification indicia with said item.

2. The system of claim 1, wherein said item is a component part.

3. The system of claim 1, wherein said first and said second unique identification indicia are part numbers.

4. A system for tracking parts at a central warehouse, said system being configured for:
   assigning a first unique part number to a part within said central warehouse;
   updating a database to associate said first unique part number with said part;
   receiving an indication that said part has been modified;
   in response to receiving said indication, assigning a second unique part number to said part without physically moving said part; and
   updating a database to associate said second unique part number with said part.

5. The system of claim 4, wherein said system is configured for maintaining a history of one or more unique part numbers that were formally associated with said part.

6. The system of claim 4, wherein said system is configured for maintaining a history of substantially all of the unique part numbers that have been associated with said part since said part entered said central warehouse.

7. The system of claim 4, wherein said step of receiving an indication that said part has been modified comprises receiving an indication that said part has been loaded with a particular type of software, and wherein said second unique part number corresponds to a part that has been loaded with said particular type of software.

8. The system of claim 4, wherein said step of updating said database to associate said second unique part number with said part includes changing a part number designation associated with said part from said first unique part number to said second unique part number.

9. A method of tracking items within a central warehouse, said method comprising the steps of:
- assigning a first unique identification indicia to an item within said central warehouse;
- updating a database to associate said first unique identification indicia with said item;
- reallocating said item from a first corporate entity to a second corporate entity without physically moving said item;
- in response to said item being reallocated from said first corporate entity to said second corporate entity, assigning a second unique identification indicia to said item; and
- updating said database to associate said second unique identification indicia with said item.

10. The method of claim 9, wherein said item is a component part.

11. The method of claim 9, wherein said first and said second unique identification indicia are part numbers.

12. A method of tracking parts at a central warehouse, said method comprising the steps of:
- assigning a first unique part number to a part within said central warehouse;
- updating a database to associate said first unique part number with said part;
- modifying said part;
- in response to said part being modified, assigning a second unique part number to said part without physically moving said part; and
- updating a database to associate said second unique part number with said part.

13. The method of claim 12, wherein said method comprises the step of maintaining a history of one or more unique part numbers that have been formally associated with said part.

14. The method of claim 12, wherein said system is configured for maintaining a history of substantially all of the unique part numbers have been associated with said part since said part entered the central warehouse.

15. The method of claim 12, wherein said step of modifying said part comprises loading software onto said part.

16. The method of claim 12, wherein said step of modifying said part comprises labeling said part.

* * * * *